W. McGREGOR
Plow-Colter.
No. 209,129.  Patented Oct. 22, 1878.
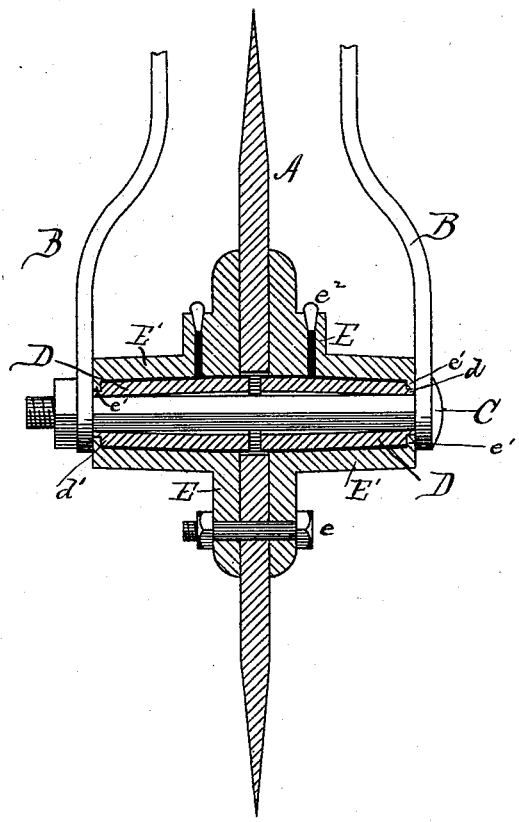
WITNESSES:
Forde R. Smith
Raymond Bliss
INVENTOR:
Wm McGregor
by Munday & Evarts
his attys.

UNITED STATES PATENT OFFICE.

WILLIAM McGREGOR, OF ROCKFORD, ILLINOIS, ASSIGNOR TO N. C. THOMPSON, OF SAME PLACE.

IMPROVEMENT IN PLOW-COLTERS.

Specification forming part of Letters Patent No. 209,129, dated October 22, 1878; application filed April 18, 1878.

*To all whom it may concern:*

Be it known that I, WILLIAM MCGREGOR, of Rockford, in the county of Winnebago and State of Illinois, have invented certain Improvements in Plow-Colters, of which the following is a specification:

The design of this invention is to so construct the bearings of the colter that the dirt will be excluded therefrom and the wear of the parts be reduced to a minimum.

The construction by which this end is attained will be fully understood by reference to the accompanying drawing, which shows a central section of a colter embodying my improvements, and wherein—

A represents the colter proper, and B B the ends of the yoke wherein it is held. C is the bolt passing through the yoke ends and the colter and securing the parts together. D D are slightly-tapering sleeves, fitting the bolt, and extending from the center of the colter to the yoke at each side. Interiorly these sleeves are square, to conform to the exterior of the bolt; but exteriorly they are round, as they form the pivotal surface whereon the colter revolves. The exterior corner of their outer or small ends is cut away so as to form an annular flange, $d$, surrounding the bolt-opening, and an abrupt vertical shoulder, $d'$, adjoining.

E E are the usual strengthening-disks, placed at either side of the colter and secured by bolts, of which $e$ is one, passing through them and the colter. These disks and their hubs E', which extend to the yoke at either side, taper and otherwise conform to the sleeves D, upon which they revolve. Around the opening, at the outer end, each is provided with an annular lip, $e^1$, corresponding to and setting up against the shoulder $d'$ and flange $d$ upon the sleeve, as fully explained in the drawing.

The hubs are cast in one piece with the disks, as shown, and they may be provided with plugged oil-openings, as at $e^2$, if desired.

I claim as new—

The combination, with the colter and its supporting-yoke, of the square bolt passing through and securing the parts together, the tapering sleeves upon said bolt forming the pivotal surface for the colter, and the disks bolted to the colter and provided with hubs, which extend laterally to the yoke and inclose and revolve upon the said sleeves, substantially as specified.

WILLIAM McGREGOR.

Witnesses:
EDW. S. EVARTS,
JOHN W. MUNDAY.